(12) United States Patent
Webb et al.

(10) Patent No.: US 9,740,505 B2
(45) Date of Patent: Aug. 22, 2017

(54) ACCURATE STATIC DEPENDENCY ANALYSIS VIA EXECUTION-CONTEXT TYPE PREDICTION

(71) Applicant: The MathWorks, Inc., Natick, MA (US)

(72) Inventors: Peter Hartwell Webb, Newton, MA (US); James T. Stewart, Newton, MA (US); Todd Flanagan, Milford, MA (US)

(73) Assignee: The MathWorks, Inc., Natick, MA (US)

( * ) Notice: Subject to any disclaimer, the term of this patent is extended or adjusted under 35 U.S.C. 154(b) by 61 days.

(21) Appl. No.: 14/332,075

(22) Filed: Jul. 15, 2014

(65) Prior Publication Data

US 2016/0019071 A1 Jan. 21, 2016

(51) Int. Cl.
*G06F 9/44* (2006.01)
*G06F 3/00* (2006.01)
(Continued)

(52) U.S. Cl.
CPC .............. *G06F 9/4436* (2013.01); *G06F 8/31* (2013.01); *G06F 9/44521* (2013.01); *G06F 11/3688* (2013.01)

(58) Field of Classification Search
CPC .............. G06F 9/4436; G06F 9/44521; G06F 11/3688; G06F 8/31
(Continued)

(56) References Cited

U.S. PATENT DOCUMENTS

2005/0138110 A1* 6/2005 Redlich ............ C07K 14/70575
709/201
2006/0277526 A1* 12/2006 Webb .................. G06F 8/30
717/109

(Continued)

OTHER PUBLICATIONS

Antoniol, G. et al., "Library Miniaturization Using Static and Dynamic Information," International Conference on Software Maintenance, 2003, ICSM 2003, Proceedings, Jan. 1, 2003, pp. 235-244, XP55211724, DOI: 10.1109/ICSM.2003.1235426.

(Continued)

*Primary Examiner* — H S Sough
*Assistant Examiner* — Kimberly Jordan
(74) *Attorney, Agent, or Firm* — Nelson Mullins Riley & Scarborough LLP

(57) ABSTRACT

Exemplary embodiments provide methods, mediums, and systems for generating a runtime environment that is customized to a particular computer program, particularly in terms of the function definitions that support function calls made in the computer program. The customized runtime environment may therefore be smaller in size than a conventional runtime environment. To create such a customized runtime environment, an analyzer may be provided which monitors test executions of the computer program and/or performs a structural analysis of the source code of the computer program. The analyzer may determine a list of probabilistically or deterministically required function definitions, and provide the list to a component reducer. The component reducer may eliminate any function definitions not deemed to be required from a runtime environment, thereby producing a customized runtime environment that is built to support a particular computer program.

24 Claims, 12 Drawing Sheets

(51) Int. Cl.
*G06F 9/46* (2006.01)
*G06F 11/36* (2006.01)
*G06F 9/445* (2006.01)

(58) Field of Classification Search
USPC ........................................................ 719/331
See application file for complete search history.

(56) References Cited

U.S. PATENT DOCUMENTS

2009/0138847 A1* 5/2009 Beckwith ................ G06F 9/443
717/108
2009/0210688 A1 8/2009 Kohiga

OTHER PUBLICATIONS

International Search Report and Written Opinion, PCT/US2015/040528, dated Sep. 18, 2015, pp. 1-10.
Second Written Opinion, PCT/US2015/040528, dated Jun. 29, 2016, 6 pages.
International Preliminary Report on Patentability, PCT/US2015/040528, dated Sep. 23, 2016, pp. 1-7.

* cited by examiner

ACCURATE STATIC DEPENDENCY ANALYSIS VIA EXECUTION-CONTEXT TYPE PREDICTION

DETAILED DESCRIPTION

Figure 1A:
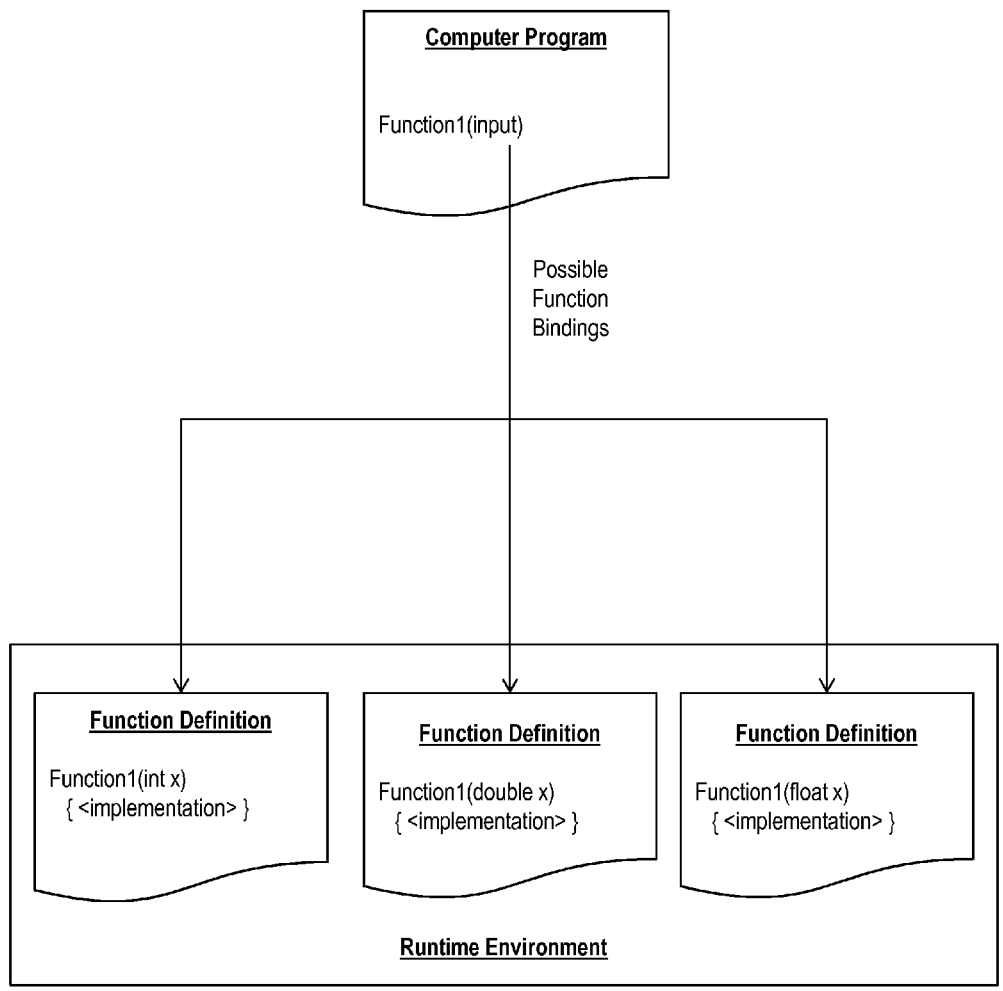
FIG. 1A depicts an exemplary computer program calling an overloaded function.

Computer programs are often supported by runtime environments which provide support to the program as the program executes. Among other functionality, the runtime environment may provide implementations for functions called by the computer program. However, in some cases, not all of the function implementations will be used by a particular computer program, which causes the runtime environment to be larger in size than it needs to be.

Exemplary embodiments described herein may provide methods, mediums, and systems for generating a runtime environment that is customized to a particular computer program. By reducing or eliminating unused function definitions, the runtime environment may be made smaller in size than a conventional runtime environment. The customized runtime environment may therefore require less hard drive space on a computer running the computer program.

A computer program may define functionality to be carried out by one or more processors, typically in the form of instructions executable by the one or more processors. A computer program may be written in one or more high-level programming languages, such as C++, Java, or the MATLAB technical computing language.

The computer program may be represented as one or more source code files including instructions written in the one or more high-level programming languages. The instructions may be translated from the one or more high-level programming languages into a language that is understandable by the one or more processors, a process referred to as compiling the program. The time during which the code is being compiled can be referred to as a compile time of the program. Executing compiled instructions can be referred to as running, or executing, the computer program. The time in which the instructions execute can be referred to as a run time of the program.

The computer program may make use of one or more functions. A function is a code construct that can operate on zero or more input arguments to produce zero or more output arguments by manipulating information. As used herein, the term function is intended to be synonymous with a procedure, method, subprogram, subroutine, and other similar terms.

A function may include elements such as input arguments, output arguments, implementation details that use the input arguments (if any) to manipulate information and/or the output arguments, and a function name that identifies the function. Together, these elements may be referred to as a function definition.

A computer program may instruct a computer to carry out implementation details of a function by providing the computer with the function name and input arguments required by the function. This process can be referred to as calling the function.

A function name may be a part of a function signature that can identify the function and map a function call in a computer program to a function definition. When the function is called using the function name, the corresponding function definition may be retrieved from memory and the implementation details may be executed. In addition to a function name, the function may be associated with a path that describes where the implementation details of the function are stored (e.g., in a directory, subdirectory, or folder structure) and/or a path that describes a location of the implementation details of the function in memory.

Input arguments and output arguments of the function may be associated with one or more data types, which describe how the input arguments and output arguments are represented in memory. Examples of data types include:

the int type, which may indicate that the value of the argument is an integer representation that is stored in a memory space 32 bits long;

the float type, which may indicate that the value of the argument is a floating-point representation that is stored in a memory space 32 bits long; and the double type, which may indicate that the value of the argument is a floating-point representation that is stored in a memory space 64 bits long.

Many other data types exist and are suitable for use with exemplary embodiments described herein.

Some programming languages support function overloading, which means that more than one function definition may be provided for a particular function name. The multiple different function definitions may vary, for example, in the number and/or type of input and/or output arguments.

The possible function bindings, which may be used by a program, may be provided by a runtime environment. A runtime environment supports a programming language by providing core functionality for use by computer programs written in the programming language. Such functionality could include, for example, allocating space for local variables declared in the programming language, managing a processor stack, providing basic mathematical capabilities, supporting function overloading by providing a mechanism for distinguishing between function definitions based on a given function signature, etc. Examples of runtime environments include, but are not limited to, the Java Virtual Machine and the MATLAB technical computing environment.

FIG. 1A depicts an example of a runtime environment providing multiple function definitions for use in a computer program. The computer program includes an instruction that represents a call to the function Function1 with an input argument named input.

In this example, the runtime environment provides three possible definitions for the function Function1. The first function definition is used when Function1 is called with an input argument of the type int. The second function definition is used when Function1 is called with an input argument of type double. The third function definition is used when Function1 is called with an input argument of type float.

In order to use an overloaded function during an execution of the computer program, one of the function definitions is selected by providing details that narrow the multiple possible function definitions to the single definition to be used. This process is referred to as function binding. A function binding may be represented as:

{Input and Output Argument Types}+Name=Path

Where the Path represents a location of the function implementation details. The implementation details of a function can only be executed by a runtime environment of the correct type. The function's path, therefore, implies a particular runtime environment.

In other words, a function binding may represent a combination of:
the types of the arguments used by the function;
the name of the function;
the path to the function implementation details; and
the runtime environment capable of executing those implementation details.

Given these elements, a function definition may be selected from among the possible function definitions to which the function may be bound.

For example, in FIG. 1A, Function1 may be bound to the implementation Function1(int x) by calling Function1 (the function name) with an input argument of type int (the input argument type), and optionally specifying a function path (e.g., "C:\Libraries\Math.c"). If no function path is specified, a default function path may be used. For example, when a runtime environment identifies a function call and identifies that no function path has been specified, the runtime environment may be programmed to look for the implementation details of the function in a default folder or an ordered list of folders, such as the local folder of the computer program source code or a default folder specified by the runtime environment. The list of places searched may further span multiple runtime environments.

In practice, the function name and the function path may often be determined from source code defining the computer program that calls the function—the function's required runtime environment is almost always determinable by examining the source code. In some circumstances, however, the types of the input and/or output arguments may not be determinable based solely on the source code, as in the case where an end user is permitted to provide input to the computer program. The type of the input that will be supplied may not be known at the time the program is written. In a further example, a function call may be received by a first runtime environment from a second (different) runtime environment. The source code making the call may either be unavailable or otherwise unanalyzable. Thus, it may be not be possible to determine what the function's input arguments are.

Accordingly, function binding may either be performed when the source code of the computer program is compiled (referred to as early function binding or static function binding), or may be deferred until the computer program is run (referred to as late function binding, dynamic function binding, or virtual function binding). In early function binding, the binding may be performed by the compiler based on information in the source code. However, if the compiler does not have sufficient information to determine which function binding will be used (e.g., because all of the input argument types are not known at compile time), then binding may be performed during a run time of the program based on the arguments that are provided as the program runs.

Late binding may be used when the information required to determine a function binding is incomplete. A late binding collects together all the functions that might satisfy the function binding; a late binding is a set of functions that might be called. When the required information becomes available, typically just before the runtime environment invokes the function, the runtime environment examines the late binding set and chooses the function binding that best satisfies the available information. The criteria for satisfaction may include counting function arguments, analyzing and comparing function argument types, determining which function argument type has highest priority, and computing the cost of converting arguments from one type to another.

A programming language that supports late function binding is referred to as a late-bound programming language, and a computer program written in such a language is referred to as a late-bound program. Similarly, a programming language that supports early function binding is referred to as an early bound programming language, and a computer program written in such a language is referred to as an early-bound program.

Figure 1B:
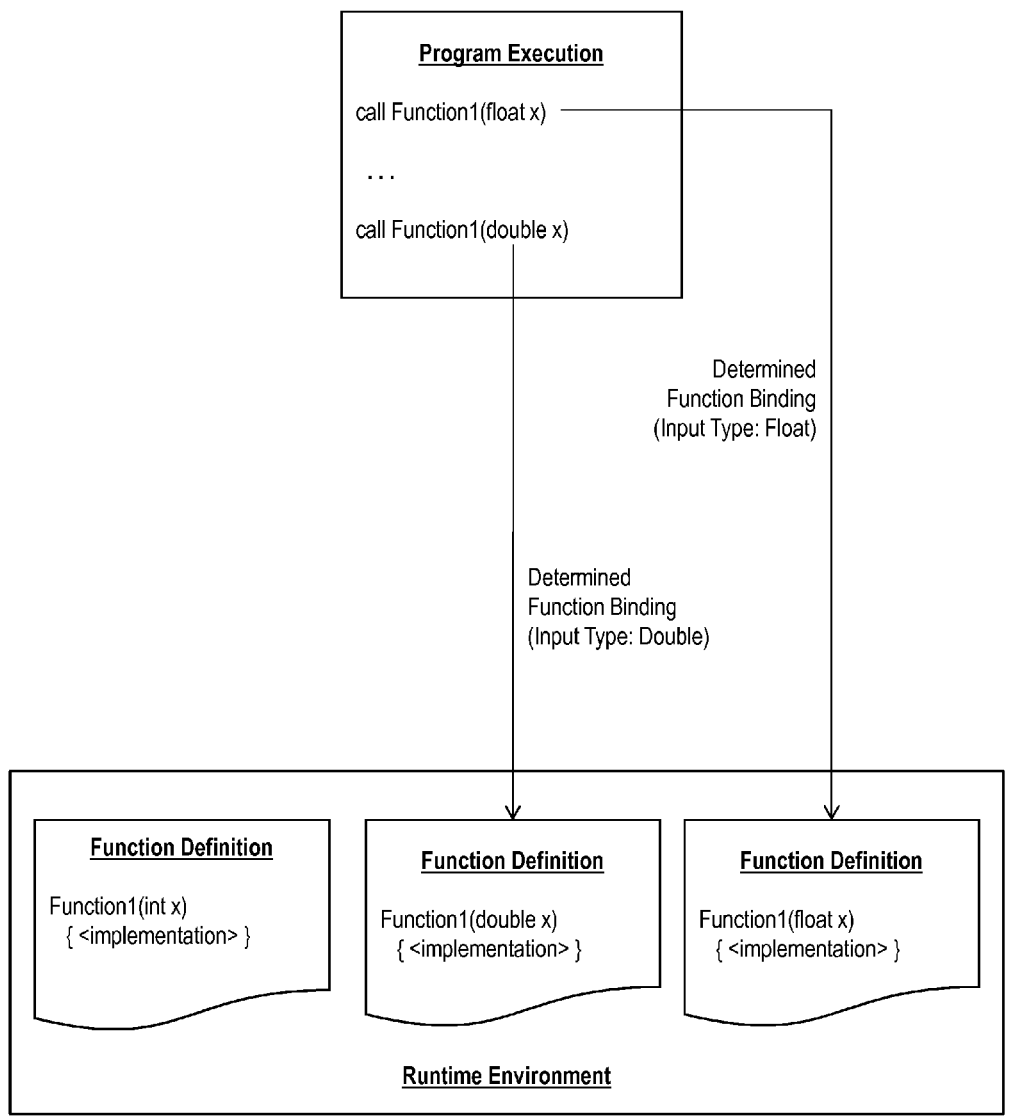
FIG. 1B depicts an example of late binding of the overloaded function of FIG. 1A.

FIG. 1B provides an example of late binding with respect to the computer program of FIG. 1A. As the computer program executes, Function1 is called twice: first with an input argument of type float, and second with an input argument of type double. In this case, the function binding may be determined at run time, and the function calls may be mapped to the appropriate function definitions provided by the runtime environment. These function calls are mapped to specific function definitions from among the multiple possible function definitions stored in the runtime environment.

The runtime environment is typically present on both the program developer's machine (so that the developer may write and test the program) and the end-user's local machine (in order to support an execution of the program by the end user). When a developer is writing the computer program, the developer may not know which function bindings will be needed by the end user. For example, the developer may not know what type of data the end user will provide to the computer program as the program executes. Even if the developer does know the end user data types, the developer may not be able to enumerate the list of all the required function bindings. A runtime environment is complex, consisting of many inter-dependent layers and sub-divisions. A developer familiar with the functions of a given layer may not know how those functions depend on the functions of other layers or sub-divisions. Accordingly, most programming languages use general runtime environments which provide all available function definitions for an overloaded function. Therefore, the developer may be confident that the execution of the program will not fail because a function definition was not provided for a data type that the end user wishes to use.

Thus, due to the use of general runtime environments, all of the available function definitions are provided to the end user, even though some possible function definitions will never be used by the computer program run by the end user. For example, as shown in FIG. 1B, the definition Function1 (int x) is never called by the execution of the computer program, but is nonetheless provided in the general runtime environment.

This means that the runtime environment provided to the end user may be larger than what is necessary to run the computer program. This requires excess storage space on the end user's local machine to store the general runtime environment. Furthermore, processing a large general runtime environment unnecessarily consumes hardware resources, slows application startup times, and makes analysis of the application unduly long and complicated. Finally, acquiring certain layers or sub-divisions of a runtime environment may require monetary outlay, creating additional costs. Clearly, there is benefit to minimizing the size of the runtime environment. Exemplary embodiments overcome the issues noted above, which are present in conventional programming environments.

Figure 1C:
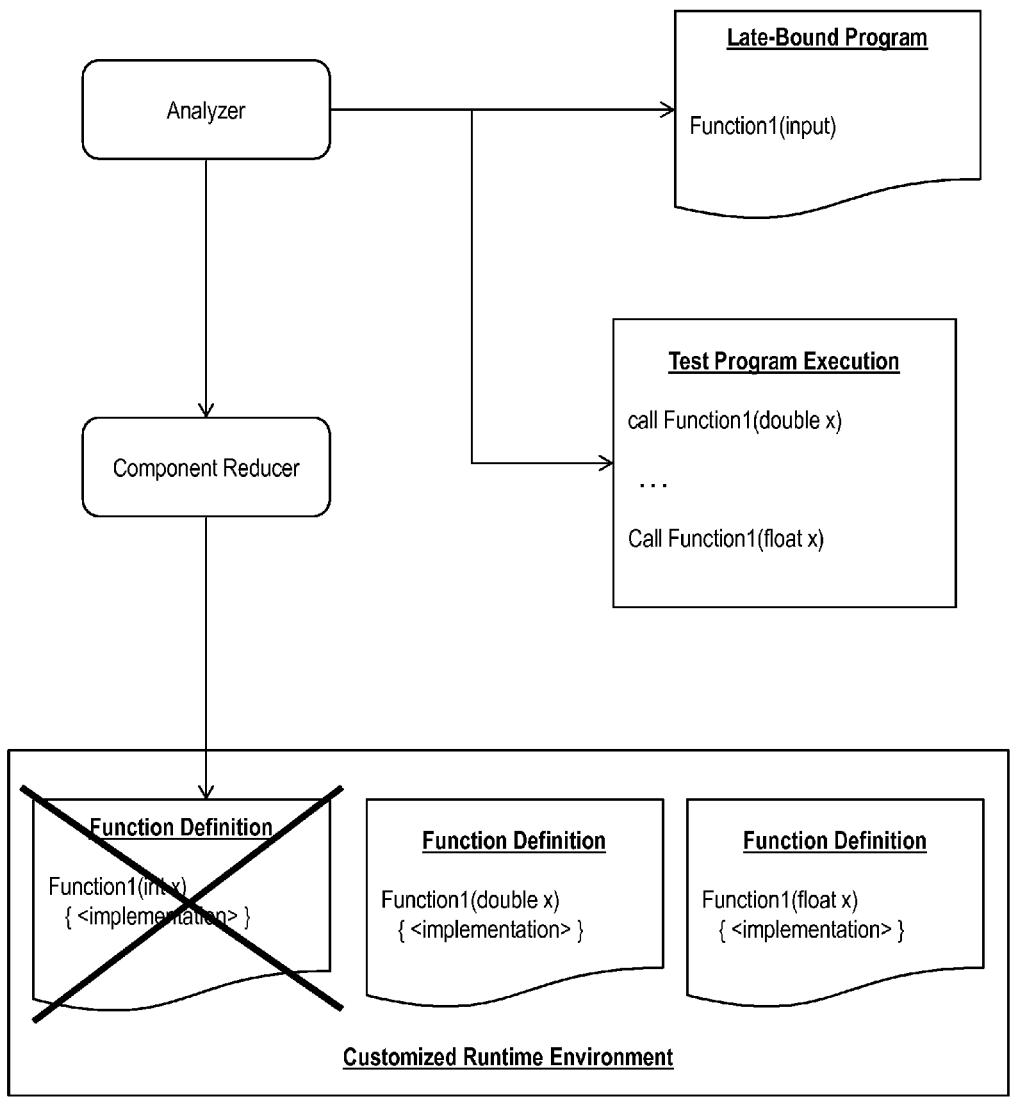
FIG. 1C depicts an exemplary system for generating a customized runtime environment that is tailored to the computer program of FIG. 1A.

FIG. 1C illustrates a technique for overcoming some of the noted shortcomings associated with conventional programming environments. For example, the embodiment of FIG. 1C, may provide an analyzer and a component reducer that provide a customized runtime environment. The analyzer analyzes a late-bound program and/or test executions of the program, and provides the results of the analysis to the component reducer. Using the results of the analysis, the component reducer generates the customized runtime environment, which is a smaller version of the general runtime environment. The customized runtime environment is customized to the analyzed late-bound program by removing function definitions that are not used by the late-bound program. In the case of a program that requires multiple runtime environments, this process can be repeated for each required runtime environment. In certain cases, the analysis may reveal that supposedly required runtime environment is actually never used and that runtime environment may be eliminated from the collection of files provided to the end user. Eliminating an entire runtime environment provides significant benefit, reducing required disk space, program memory, program startup time and installation cost.

Figure 2:
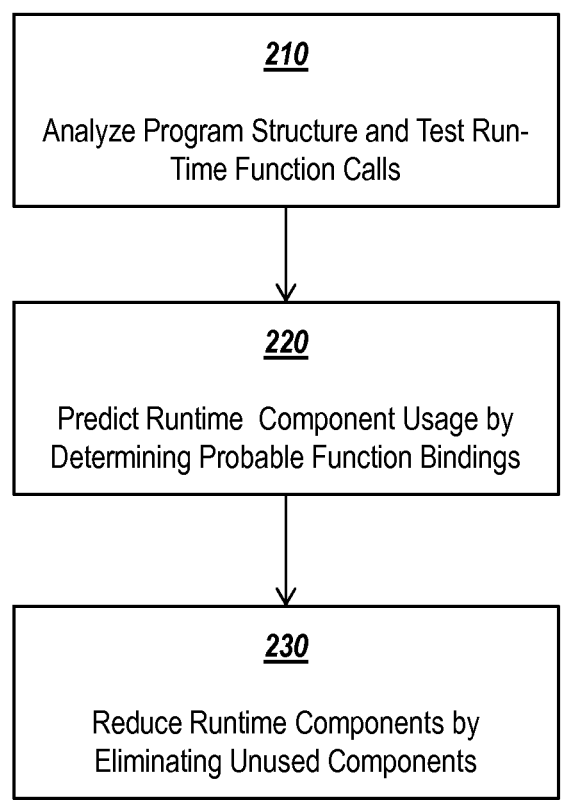
FIG. 2 is a flowchart providing an overview of an exemplary process for generating a customized runtime environment.

An exemplary procedure for generating a customized runtime environment is depicted in FIG. 2. In order to provide the customized runtime environment, at step 210 the analyzer may examine the late-bound program to determine structural information relating to the context in which certain functions are called, and/or may examine test executions of the late-bound program to identify which function bindings occur in real-world usage situations. In addition, the analyzer may be provided with structural information or execution information from other programs. This additional information may increase the accuracy of analysis by providing data as to how functions used by this program interact when used in a different context.

The structural information may include information about the context of a function call extracted from the source code of the program. For example, if the output of a first function is provided as an input to a second function, then the input argument types of the second function must agree with the possible output argument types of the first function. Accordingly, it may be possible to reduce the possible function bindings for the second function by eliminating any function definitions for the second function whose input arguments are not possible output arguments of the first function. Alternatively or in addition, some functions may frequently be called together with the same inputs, so some function bindings for a first function may be eliminated if the function bindings are incompatible with input types for a second function frequently called with the first function.

The execution information may include the function bindings that occurred during test executions of the program. By testing the program using a wide variety of input types and test cases, the analyzer may identify which function bindings occur and which do not occur. As more extensive tests are performed, the analyzer can assign an increasing confidence that the unused function bindings will not occur under normal usage scenarios.

Function bindings often do not occur in isolation. The implementation of a given function typically invokes one or more other functions. Each function invocation therefore typically occurs as part of one or more chains or series of function calls. The sequence of function bindings that precedes any given function binding can be used to probabilistically predict the path of the given function binding, even if the function argument type information is unavailable.

The structural analysis of step 220, alone or in conjunction with test executions, may definitively determine, or may probabilistically determine, a set of function definitions that are required to support the late-bound program. Alternatively or in addition, the analyzer may identify (deterministically or probabilistically) a set of function definitions that are not used by the late-bound program. The analyzer may create a list of function definitions which the analyzer deems are likely to be used during an execution of the late-bound program. The list of function definitions may be provided to the component reducer.

At step 230, based on the information determined by the analyzer, the component reducer may create the customized runtime environment by eliminating unused function definitions from the runtime environment. For example, the component reducer may remove components corresponding to unused function definitions from a general runtime environment. Alternatively, the component reducer may build a customized runtime environment from scratch, using only components corresponding to function definitions that the analyzer deems are likely (e.g., above a predetermined probability threshold) to be needed.

Thus, a customized runtime environment having a reduced size (as compared to a corresponding general runtime environment) may be generated. For example, in some experiments performed using the MATLAB technical computing environment, the size of a deployed customized runtime for a computer program was reduced from 6 GB (the size of the general runtime) to 80 MB (the size of the customized runtime, which seventy-five times smaller than the general runtime). The customized runtime environment may be customized to the computer program for which the analysis was performed at step 210, and may be packaged with the computer program for deployment, installation, and/or execution of the computer program.

Figure 3:
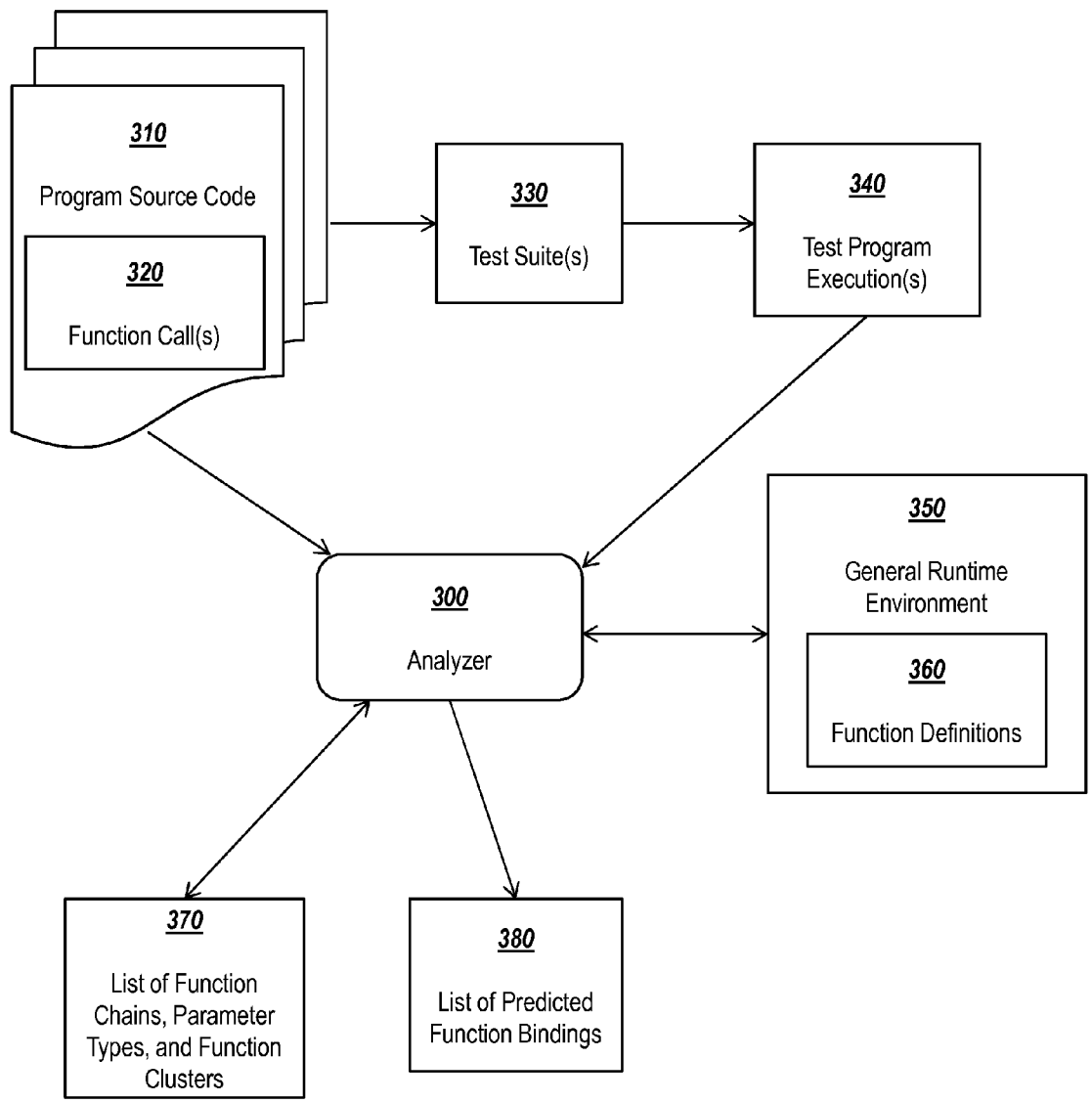
FIG. 3 depicts an exemplary analyzer for analyzing source code structure and/or test program executions.

As noted above, in order to produce the customized runtime environment, a late-bound computer program under test may be analyzed by the analyzer. An exemplary analyzer 300 is depicted in FIG. 3.

The analyzer 300 may test the computer program by performing structural analyses and/or by running test executions of the computer program. Based on these structural analyses and test executions, the analyzer 300 may determine a list of predicted function bindings that will be used during execution of the computer program and/or a list of predicted function bindings that will not be used during execution of the computer program.

The analyzer 300 may include hardware logic, software logic, or a combination of one or more pieces of hardware logic and/or one or more pieces of software logic for performing the tests. The analyzer 300 may operate before a run time of the computer program (e.g., when performing a structural analysis on the source code of the program). The analyzer 300 may further operate during a run time of the computer program (e.g., by observing an execution of the computer program to determine which function bindings occur in real-world usage scenarios). Still further, the analyzer 300 may operate after a run time of the computer program (e.g., when comparing the structural analysis to the observed function bindings that occurred during test executions).

The analyzer 300 may receive or identify program source code 310. The program source code 310 may include a list of instructions written in a high-level programming language and may include one or more function calls 320. The program source code 310 may be stored in one or more files.

The analyzer 300 may access one or more test suites 330 which include tests to be performed on the computer program represented by the program source code 310 while the program executes. The test suites 330 may include various input parameters, operating conditions, and/or expected outputs that are designed to verify that the computer program operates correctly in real-world use situations. For example, the test suites 330 may test to ensure that the computer program runs without error (e.g., that the computer program runs to completion without crashing when given inputs of different types, numbers, and/or sizes) and/or may test to ensure proper operation of the program (e.g., that the computer program produces the expected output for a given input).

The test suites 330 may be predetermined test suites that are packaged with the analyzer 300. Alternatively or in addition, the test suites 330 may be custom or user-defined test suites.

The test suites 330 may be used to perform one or more test program executions 340. For example, the program source code 310 may be compiled into an executable. The executable may be run one or more times using inputs specified by the one or more test suites 330. Alternatively or in addition, the program source code 310 may execute within the general runtime environment, which in some circumstances may not require that the program source code 310 be compiled. In this case, a function call tree may provide raw data used for computing a list of function call chains. Optionally, the test suites 330 may be used to determine whether the computer program produced an expected output.

As the test program executions 330 run, the one or more function calls 320 in the program source code 310 may be bound to one or more function definitions. Accordingly, the computer program may make use of a runtime environment 350 that provides the function definitions 360. The runtime environment 350 may be a general runtime environment that provides function definitions 360 for multiple available function bindings without regard to whether the function bindings will actually occur during execution of the computer program.

As the one or more function calls 320 are bound during the test program executions 340, the analyzer 300 may monitor and/or record these function bindings for further analysis. Based on this analysis, the analyzer 300 may produce a list 370 of parameter types, function chains, and function clusters. For efficiency, the list 370 may be stored in a database. Using the observed function bindings and list 370, the analyzer 300 may produce a list 380 of predicted function bindings that may be used by the computer program. After analysis, the analyzer may record the list 370 for use during subsequent analyses.

Parameter types may represent the types of variables that are present in the program source code 310. If a variable having a defined parameter type is used in the source code and passed as an argument to a function, then it may be possible to narrow the possible function bindings based on those bindings which are compatible with the known parameter type.

A function chain, or equivalently a function call chain, can describe a situation where the output of a first function is provided as an input to a second function. Therefore, the second function must be capable of accepting an input that matches the output of the first function. When predicting which function bindings will be used by the computer program, any function definition for the second definition in which the input type is not compatible with the first function's output type(s) may be discarded.

Figure 4A:
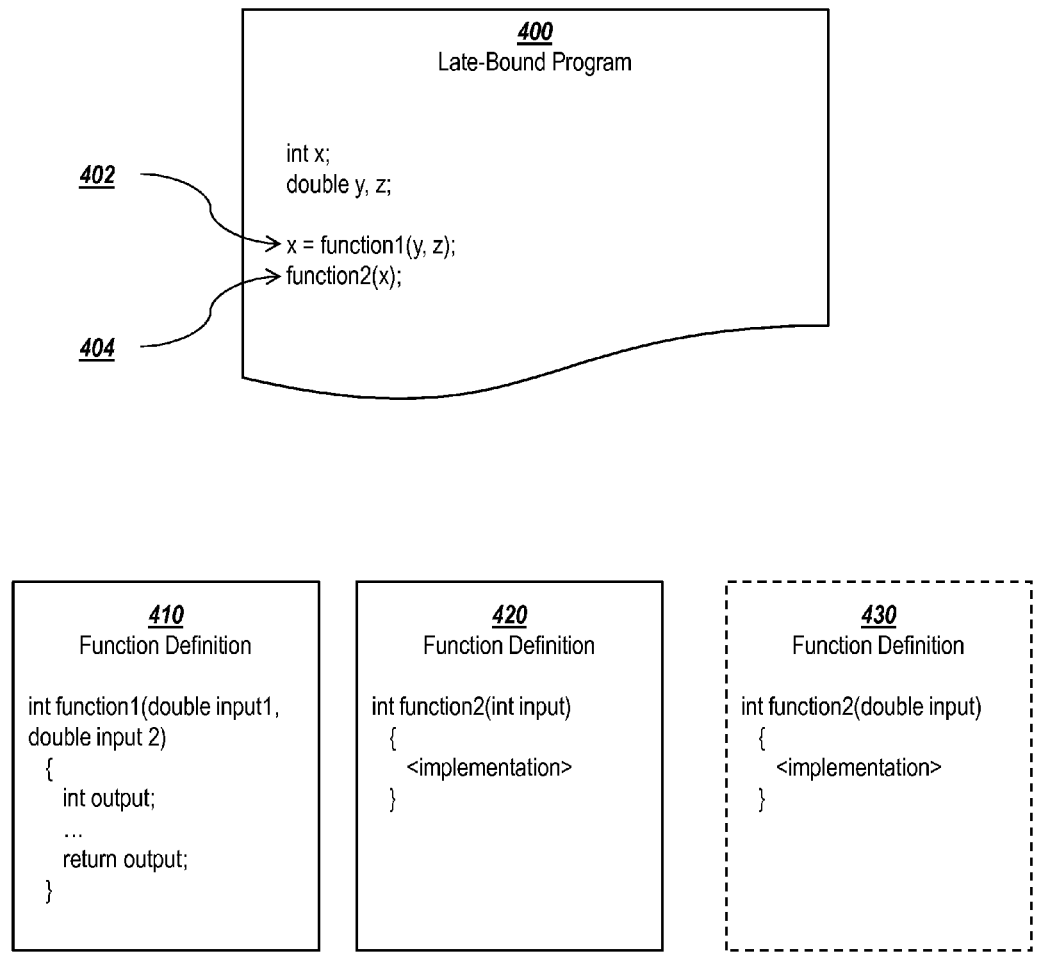
FIG. 4A depicts an example of a function call chain which may be analyzed by an exemplary analyzer.

An example of a function call chain is depicted in FIG. 4A. In this example, a late-bound program 400 includes a call 402 to a first function named function1. The function function1 takes two inputs of type double and returns an output of type int, as shown in the function definition 410 for function1.

For ease of discussion, it is assumed that int and double are incompatible types, which may not be the case in all programming languages.

The late-bound program 400 further includes a call 404 to a second function named function2. The function function2 is an overloaded function having two possible function definitions. The first function definition 420 takes an input of type int and returns an output of type int. The second function definition 430 takes an input of type double and returns an output of type int.

In the late-bound program 400, function2 may only be called with an input argument of x, where x represents the output of function1. The function function1 is not an overloaded function and only provides an output of type int. Thus, function2 only accepts an input of type int during the execution of the late-bound program 400. Therefore, the second function definition 430 for function2, which takes an input of type double, will not be used and can be excluded from a customized runtime environment.

In this case, function2(int) is an exact match for the input arguments, and therefore may be called unambiguously. However, there are other cases where no exact match exists, and the runtime falls back to a less perfect, but still acceptable function binding.

In general, the runtime looks for the "best match" when trying to determine a function binding. Computing the best match involves runtime environment-specific rules, which may include automatic type conversions. For example, if function2(int) was not available, most runtime environments would fall back to function2(double), since an int can be converted to a double without loss of data. The analyzer 300 may take these conversion and best match rules into account when determining what functions might be called.

In addition to function chains, the analyzer may also use function clusters in order to predict which function bindings will be used by the computer program. Function clusters (also referred to as neighbor functions) are groups of two or more functions that are frequently called together with the same inputs, often because the functions in the cluster have related functionality. Thus, when predicting which function bindings will be used by the computer program, the analyzer may discard any function definition for a first function in which the first function's input type is not compatible with an input type of a second function in the cluster.

Figure 4B:
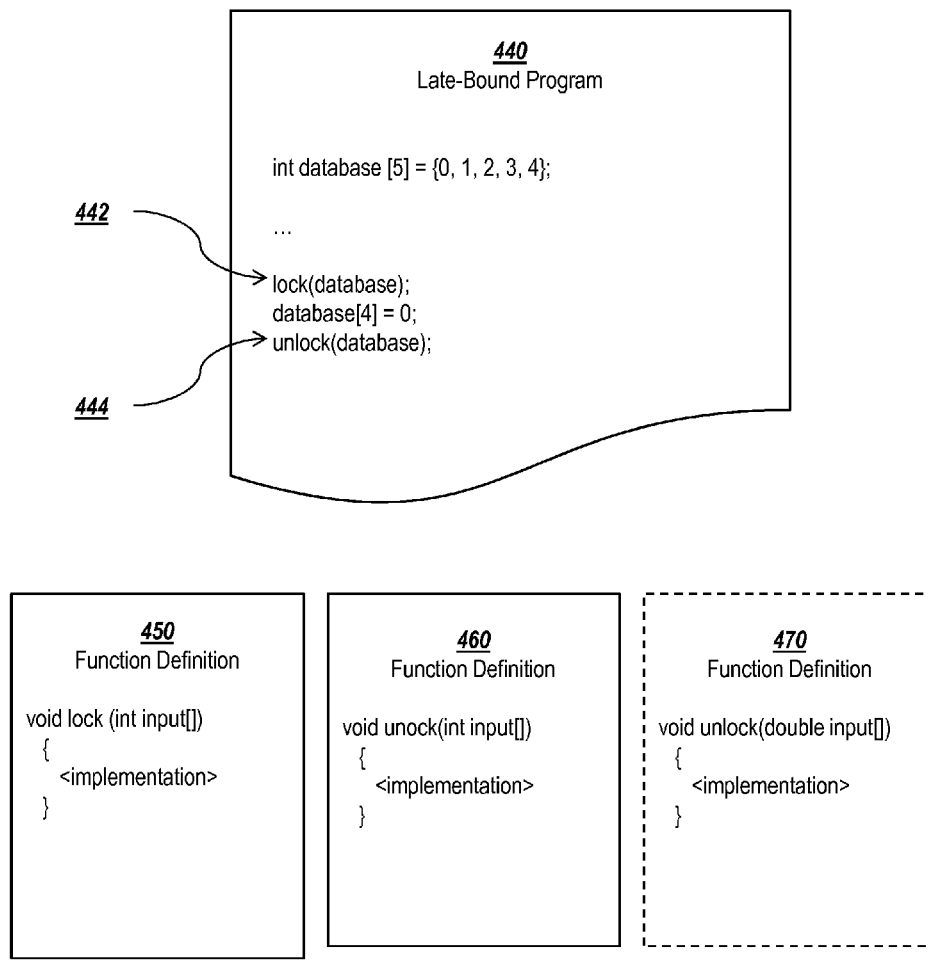
FIG. 4B depicts an example of a function cluster which may be analyzed by an exemplary analyzer.

An example of a function cluster is provided in FIG. 4B. In this example, a late-bound program 440 references a database represented as an array of integers. For example, the database might represent a shared database that could be accessed by multiple users at the same time. Accordingly, the late-bound program 440 may use functionality that locks and unlocks the database so that users cannot simultaneously edit information in the database, potentially causing a conflict over which user's input should be used.

Accordingly, in order to edit the information in the database, the late-bound program 440 may make a function call 442 to a lock function. As shown in the function definition 450 for the lock function, the lock function accepts an integer array as an input.

After locking the database and editing the information therein, a function call 444 may be made to the unlock function, which unlocks the database for further use. The unlock function may be an overloaded function with a first function definition 460 and a second function definition 470. The first function definition 460 for the unlock function accepts an int array as an input, while the second function definition 470 for the unlock function accepts a double array as an input.

In this case, the unlock and lock functions will usually be called in a pair of function calls, with both function calls accepting the same input (an input that is unlocked will typically be subsequently locked). Accordingly, when the analyzer analyzes the late-bound program 440, the analyzer may identify the unlock and lock functions as a function cluster.

In examining the function definitions 450, 460, 470, the analyzer may determine that the unlock function is capable of accepting either an int array or a double array, but the paired lock function is only capable of accepting an int array. Accordingly, the analyzer may determine that the second function definition 470 for the unlock function can be excluded from a customized runtime environment.

Figure 5:
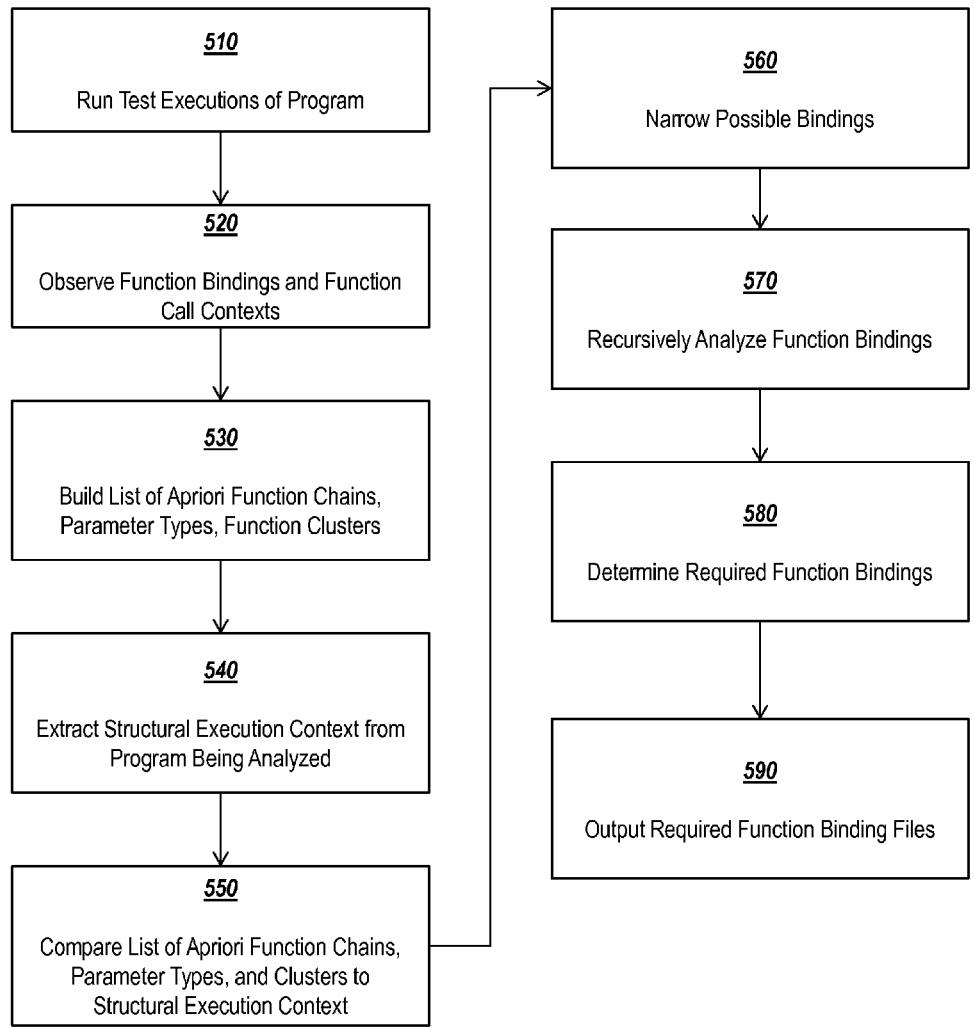
FIG. 5 is a flowchart describing an exemplary process performed by an exemplary analyzer to determine a list of possible function bindings for a computer program.

FIG. 5 illustrates exemplary processing that can be used generate a list of function chains and function clusters.

At step 510, the analyzer may observe one or more test executions of the computer program. These execution(s) of the program may allow a developer to determine whether the computer program is likely to crash during real-world executions, whether the computer program can handle data of varying types and sizes, and whether the computer program functions as expected on given input data.

Test executions of the computer program may be initiated by a developer or user, or may be initiated by an automated testing tool (such as an automated testing tool provided by the analyzer), or both. The automated testing tool may be, for example, a testing program or a script. In addition, the runtime environment may continually or intermittently record the execution of programs, storing the execution data for later use by the analyzer. The runtime environment may perform this recording automatically or only when instructed to do so by a developer or user.

Initiating a test execution of the computer program may entail instructing one or more processors to access an executable file or list of instructions corresponding to a compiled version of the computer program. The test execution may further entail passing one or more input arguments to the executable file or list of instructions. In some embodiments, the input arguments may be provided by the above-noted test suites.

The test suites may provide predefined inputs and/or operating conditions on the computer program, and optionally may provide expected outputs that the program should generate based on the predefined inputs. The computer program may be run using the inputs and/or operating conditions defined in the test suites. The test suites may be defined by a developer or another user, or may be predefined test suites packaged with the analyzer or runtime environment. The test suites may be stored locally with the program source files, or may be stored remotely and retrieved via a communication link.

During the execution(s) of the computer program that occur as the test suites are run, one or more function calls in the computer program may be bound to a function definition using the function definitions provided by a general runtime environment. Accordingly, at step 520, the analyzer may observe these function bindings and record which function definitions were used during the execution(s). The analyzer may record function definitions, function bindings, and/or other data derived from the state of the runtime environment and/or the structure of the executing program. This may include, but is not limited to: the actual values of data passed to the functions during execution; metadata describing each function's input and output argument, such as the size or dimension of each argument, the augment's type, the argument's position, the scope of the argument when created (local, global) and the precedence relationship between types known to the runtime environment.

For example, a function definition may be stored at a known location in memory. The analyzer may monitor memory access during the execution(s) of the computer program in order to determine whether the known location in memory is accessed and/or how many times the known location in memory is accessed as the computer program executes. The analyzer may store quantity information for each available function definition, or may store quantity information only for the function definitions that were accessed during the execution(s).

In addition to the observed function bindings, the analyzer may observe function call contexts. A function call context may include events that occur in a computer program that relate to the calling of a particular function.

For example, if an output of a first function is used as an input to a second function, the analyzer may flag this contextual information and note that the first function and the second function take part in a function call chain, and further that the first function's output may define the input type for the second function.

In another example, if the analyzer determines that two or more functions are frequently called together the analyzer may flag this contextual information and note that the two or more functions form a function cluster. The analyzer may determine that two or more functions form a cluster if the two or more functions are called as a group, such as when certain group behaviors are observed. For example, a group behavior may be indicated if a second function is called within a predetermined number of instructions of a first function more than a threshold number of times, or if a second function is called within a predetermined time of calling a first function more than a threshold number of times. Alternatively, a function cluster may be identified if two or more functions perform related behaviors on an input (e.g., taking an action and reversing the action).

In another example, the analyzer may identify which variables are used as input or output arguments for function calls, and may determine whether the variables have a type suggested by the operations performed on them or the functions to which they are passed into or returned from.

Once the analyzer has collected information about function bindings during test executions of the program, at step 530 the analyzer may build a list of apriori function chains, parameter types, and function clusters. The function chains, parameter types, and function clusters are considered "apriori" at this stage because it may not be possible to definitively state that the observed function bindings are the only possible function bindings. Although the function calls in the computer program have been bound at least once to a function definition, it may other function bindings may also be possible. In order to determine a full list of probable function bindings, the analyzer may perform a structural analysis on the program source code and compare the results of the structural analysis to the apriori function chains, parameter types, and function clusters.

The analyzer may gather structural information about the program for comparison to the observed execution information. Accordingly, at step 530, the analyzer may parse the file(s) of the program source code in order to extract such structural information from the program source code. At this step, the analyzer may also consult the saved function chain/cluster information 370.

The structural information may include function chains and function clusters that are determined based on an analysis of the program source code. In order to extract the function chains and function clusters from the source code, the analyzer may consider the program source code without reference to data types used in the program source code. In addition, or alternatively, the analyzer may use runtime environment-specific rules, or data from previous program executions or previous analyses, to assign probabilistic or deterministic types to the variables used in the program source code. For example, a program source instruction 'z=x+y' may, in some runtime environments, imply that variable z has the same type as variables x and y, and furthermore that the type in question may be numeric. This process of reducing the set of possible types a variable might take helps to further shorten the list of functions that the program may call.

The function chains may be identified, for example, by identifying function calls and variables in the program source code and determining if a first function provides its output as an input to a second function. The output may be provided directly to the second function, or may be provided through an intermediary such as a variable.

The function clusters may be identified, for example, by analyzing the program source code to determine whether two functions are regularly (e.g., above a threshold number of times) called in close proximity (e.g., below a threshold distance measure, such as number of intervening instructions) to each other. Function clusters may also be identified based on an examination of the function definitions. For example, functions that are related to a given function may be labeled as such in comments inside the function definition for one or more of the related functions. In another example, functions that have related function names (e.g., "do/undo/redo," "lock/unlock," etc.) may be identified a function cluster. Additionally, functions that are methods of the same class may be identified as a function cluster.

The result of the structural analysis may be a list of structurally-determined function chains, parameter types, and/or function clusters. This list may be compared to the list of apriori list of function chains, parameter types, and function clusters.

These two lists may not necessarily be identical. For example, it may appear, based on an execution of the program, that two or more functions belong in a function cluster. However, a structural analysis of the program source code, or an examination of execution data collected previously, may reveal no such relationship, and accordingly it may be determined that the functions of the purported cluster were merely called together as a result of chance.

In order to determine which function chains and function clusters are legitimate, at step 550 the analyzer may compare the structural execution context (including structurally-determined function chains and function clusters) extracted at step 540 to the list of apriori function chains, parameter types, and function clusters created at step 530. Step 550 may further include examining data collected during previous executions of the program, either during test runs or by querying the runtime environment.

Any structural function chain that matches an apriori function chain may impute the apriori parameter types used in the test execution(s) onto the actual parameters of the structural function chain. By carrying these imputed parameter types through the function chain, at step 560 it may be possible to dramatically narrow the possible function bindings for the functions of the function chain. A similar strategy may be used to analyze apriori function clusters in comparison to structural function clusters.

Furthermore, at step 560 the imputed parameters may be carried through to any dependent functions that are called by the functions of the function chain/function cluster, using the inputs imputed to the function chain/function cluster. This may allow the list of possible function bindings for the set of dependent functions to be narrowed as well.

In some embodiments, the possible function bindings may be narrowed using mathematical analyses. For example, according to one exemplary embodiment, the function calls of the computer program may be modeled as a Markov chain. A Markov chain is a system that randomly transitions from one state to another based on probabilities associated with the transitions between the states. The probabilities may be determined based on the structural analysis of the program source code and/or the observed test executions of the computer program. By performing a statistical analysis on the Markov chain, the list of possible function bindings may be narrowed (e.g., by eliminating function bindings that are deemed impossible or improbable based on the statistical analysis).

According to another exemplary embodiment, the function calls of the computer program may be analyzed using Bayesian statistical methods. Bayesian statistical methods model processes using randomness or pseudorandomness through the application of Bayes' Theorem. Bayes' Theorem addresses conditional probabilities (e.g., the probability that a second function will be called with a given argument type, given that a first function was called with a given parameter type).

The analyses carried out at step 560 may be combined with code coverage percentages to determine a level of confidence in determining or eliminating possible function bindings. A code coverage percentage may be, for example a ratio of executed code to non-executed code that is covered by the test cases during the test program executions. If some code is not executed, or is executed less than a predetermined threshold number of times, then the analyzer may have reduced confidence that certain function bindings which are (or could be) used by the unexecuted code can be excluded from the customized runtime environment.

Thus, the possible function bindings may be narrowed at step 560, in some cases dramatically so. Accordingly, it may be possible to perform further iterations of steps 540-560 using a smaller list of possible function bindings, thereby limiting the possible function bindings even further.

Therefore, at step 570 the analyzer may recursively analyze the possible function bindings using the narrowed list of possible function bindings. The analysis may repeat for a predetermined number of attempts, or may be terminated when all possible functions have been bound, or may be terminated when the list of possible function bindings does not narrow in a particular iteration (or narrows by less than a predetermined threshold amount), among other possibilities.

Accordingly, at step 580 the analyzer has determined a list of probable or deterministically required function bindings. Using this information, the analyzer may determine which files support the required function bindings. For example, the analyzer may consult the runtime environment and/or the program source code files to determine where the function bindings are stored. The analyzer may build a list of files used to support the function bindings that are determined to be necessary or likely, and may output the list to the component reducer at step 590. Alternatively or in addition, the results of the analysis may be stored in a database, or other persistent storage mechanism, to be reused when analyzing this or other programs in the future.

It should be noted that it may not be possible or desirable to definitively determine all possible function bindings which may occur during program execution. Accordingly, the required function bindings selected at steps 580 and 590 may be probabilistic function bindings, in that the analyzer considers that there is a likelihood (e.g., a probability above a certain threshold probability) that a given function definition will be needed during execution of the program. Alternatively, it may be possible to definitively determine that some function bindings are necessary or not necessary. Still further, the required function bindings may include some function bindings that are probabilistically required, and some functions that are definitively determined to be required.

Figure 6:
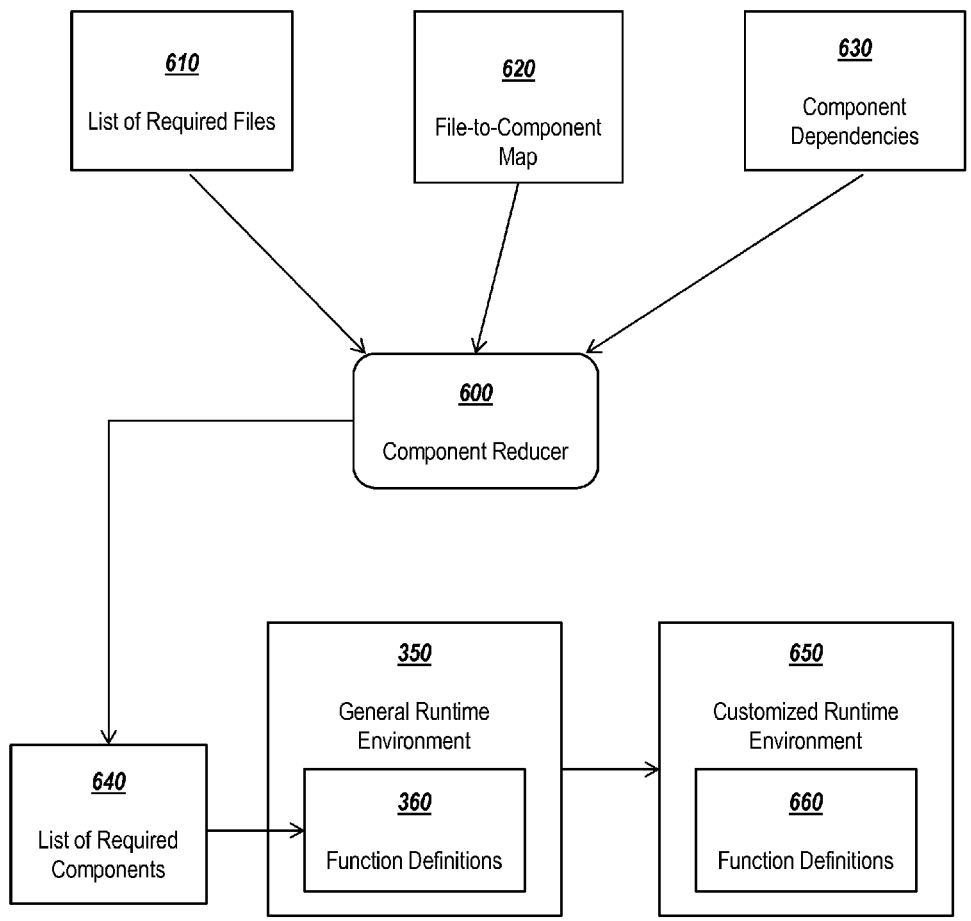
FIG. 6 depicts an exemplary component reducer for accepting a list of possible function bindings for a computer program and producing a list of required components for a runtime environment that is customized to the computer program.

The resulting list of required function binding files may be provided to a component reducer, such as the exemplary component reducer 600 depicted in FIG. 6. The component reducer 600 may use the analysis performed by analyzer 300 to reduce the number of components in a general runtime environment. Eliminated components may correspond to function bindings, or libraries or other types of collections of function bindings, which are determined to be unnecessary to the execution of the computer program to which the runtime environment is customized.

The component reducer 600 may accept or identify a list of required files 610, such as the list produced by the analyzer. The component reducer 600 may further access a file-to-component map 620, which maps a file to one or more corresponding components in the general runtime environment 350. The file-to-component map 620 may be predetermined and stored with the component reducer 600 or the general runtime environment 350, or may be determined by the component reducer 600 or analyzer based on an analysis of the general runtime environment 350, or may be provided by a user.

The files 610 may optionally be filtered through one or more stored business rules, which may modify the list of required files as determined by business rather than technical constraints. For example, certain files may be sensitive, and a business rule may prevent the sensitive files from being shipped with a product.

In addition to the files/components that the analyzer 300 expressly flags as required, some components of the general runtime environment 350 may depend on other components which are not necessarily flagged as required by analyzer 300. For example, functions within the required components may call other functions which are not flagged as required. Accordingly, the component reducer 600 may consult a list of component dependencies 630 to determine which non-flagged components should not be excluded from the general runtime environment 350. The list of component dependencies 630 may be predetermined and stored with the component reducer 600 or the general runtime environment 350, or may be determined by the component reducer 600 or analyzer based on an analysis of the general runtime environment 350, or may be provided by a user.

Accordingly, the component reducer 600 may produce a list of required components 640. The list of required components 640 may correspond to files in the list of required files 610, plus any additional dependent components as determined by the list of component dependencies 630. The list of required components may also be subject to business rules, as described above with respect to the list of files 610.

The component reducer 600 may use the list of required components 640 to reduce the number of components in a general runtime environment 350. The general runtime environment 350 may have a number of components corresponding to function definitions 360. Using the list of required components 640, the component reducer 300 may eliminate some of the components corresponding to unused function definitions from among the function definitions 360. Alternatively, the component reducer 600 could start from nothing (e.g., an empty set of components) and add to the general runtime environment 350 only those components that are included in the list of required components 640.

Component reducer 600 may produce a customized runtime environment 650 with a set of components corresponding to function definitions 660 which are customized to the computer program which was analyzed by the analyzer.

Figure 7:
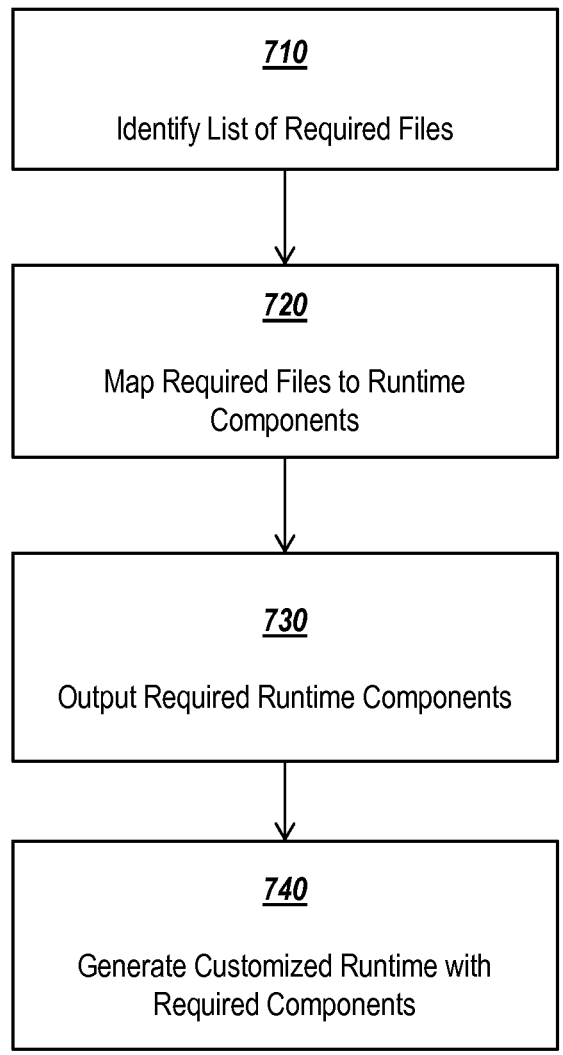
FIG. 7 is a flowchart describing an exemplary process performed by an exemplary component reducer to generate a customized runtime environment.

FIG. 7 illustrates exemplary processing for producing a customized runtime environment, such as runtime environment 650.

At step 710, the component reducer may identify a list of required files, such as a list of required files produced by an analyzer. The list of required files may include a set of files corresponding to function definitions that the analyzer determines are required, or are likely to be required, during an execution of the computer program.

At step 720, the component reducer may use the list of required files to create a list of runtime components for supporting a customized runtime environment. The component reducer may consult a file-to-component map and a list of component dependencies in order to determine which runtime components to include in the customized runtime environment.

At step 730, the component reducer may output a list of the components deemed to be required for the customized runtime. The list of components may be stored in a memory.

At step 740, the component reducer may generate a customized runtime environment including only the components that support the function definitions deemed by the analyzer to be probabilistically or deterministically required, and any dependent components supporting the identified components. For example, the component reducer may eliminate from a general runtime some of the components corresponding to unused function definitions. Alternatively, the component reducer could build a customized runtime environment from scratch by including in the customized runtime environment only those components that are included in the list of required components.

During execution of a computer program supported by a customized runtime environment, it is possible that one or more function definitions will be used which were excluded from the customized runtime environment. The analyzer may be programmed to be conservative, by applying a relatively high threshold in order to eliminate a component, but may nonetheless exclude a function that is eventually needed. In such an event, the execution of the program may fail due to the lack of a required function binding. In order to prevent such a failure in subsequent executions of the program, or to recover from the failure when it is first encountered, the customized runtime environment may include logic for automatically retrieving any needed components from a remote database, such as a developer server or vendor server. The customized runtime environment may present a prompt asking for authorization to download the missing components, and may automatically incorporate the missing components in the customized runtime environment.

Figure 8:
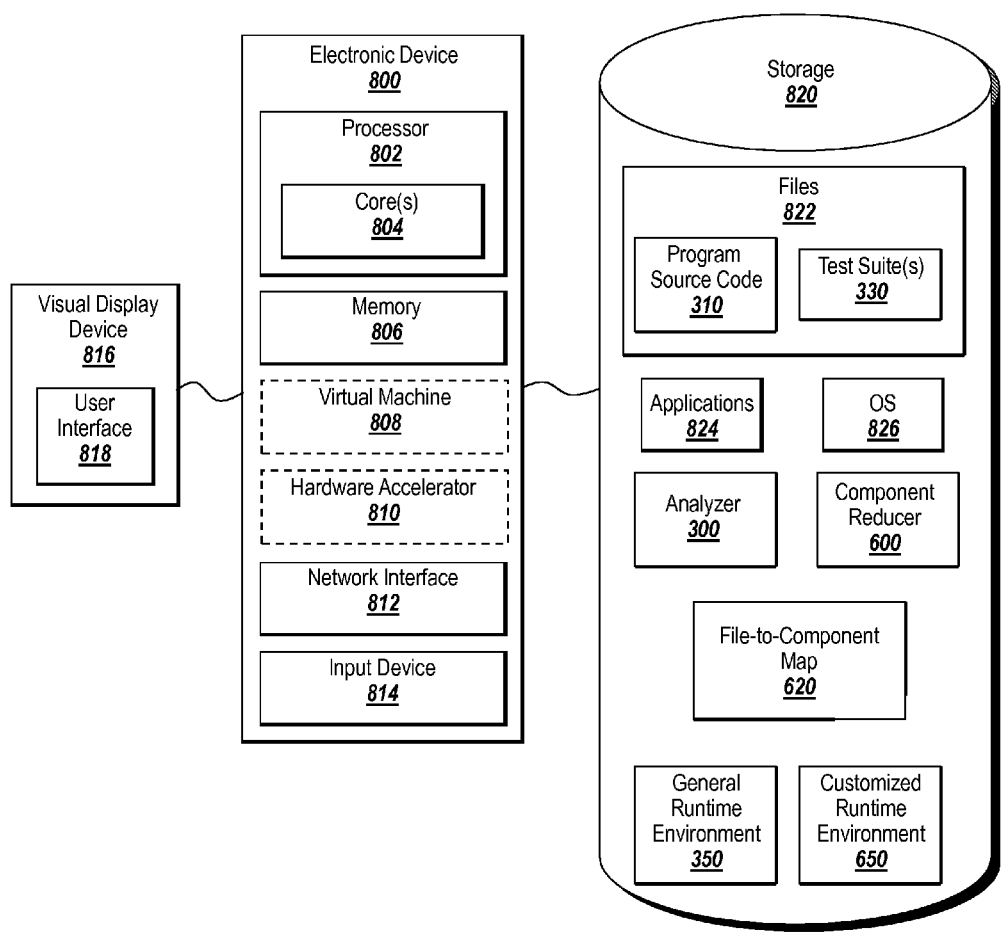
FIG. 8 depicts an exemplary electronic device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 8 depicts an example of an electronic device 800 that may be suitable for use with one or more acts disclosed herein.

The electronic device 800 may take many forms, including but not limited to a computer, workstation, server, network computer, quantum computer, optical computer, Internet appliance, mobile device, a pager, a tablet computer, a smart sensor, application specific processing device, etc.

The electronic device 800 is illustrative and may take other forms. For example, an alternative implementation of the electronic device 800 may have fewer components, more components, or components that are in a configuration that differs from the configuration of FIG. 8. The components of FIG. 8 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 802 may include hardware based logic or a combination of hardware based logic and software to execute instructions on behalf of the electronic device 800. The processor 802 may include logic that may interpret, execute, and/or otherwise process information contained in, for example, the memory 806. The information may include computer-executable instructions and/or data that may implement one or more embodiments of the invention. The processor 802 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 804. Moreover, the processor 802 may include a system-on-chip (SoC) or system-in-package (SiP). An example of a processor 802 is the Intel® Xeon® processor available from Intel Corporation, Santa Clara, Calif.

The electronic device 800 may include one or more tangible non-transitory computer-readable storage media for storing one or more computer-executable instructions or software that may implement one or more embodiments of the invention. The non-transitory computer-readable storage media may be, for example, the memory 806 or the storage 820. The memory 806 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

The electronic device 800 may include a virtual machine (VM) 808 for executing instructions loaded in the memory 806. A virtual machine 808 may be provided to handle a process running on multiple processors so that the process may appear to be using only one computing resource rather than multiple computing resources. Virtualization may be employed in the electronic device 800 so that infrastructure and resources in the electronic device may be shared dynamically. Multiple VMs 808 may be resident on a single computing device 800.

A hardware accelerator 810, may be implemented in an ASIC, FPGA, or some other device. The hardware accelerator 810 may be used to reduce the general processing time of the electronic device 800.

The electronic device 800 may include a network interface 812 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 500 to any type of network capable of communication and performing the operations described herein.

The electronic device 800 may include one or more input devices 814, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 814 may allow a user to provide input that is registered on a visual display device 816. A graphical user interface (GUI) 818 may be shown on the display device 816.

A storage device 820 may also be associated with the electronic device 800. The storage device 820 may be accessible to the processor 802 via an I/O bus. The information in the storage device 820 may be executed, interpreted, manipulated, and/or otherwise processed by the processor 802. The storage device 820 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 820 may be used for storing one or more files 822, such as the above-described program source code 310 and/or the test suites 330. The storage device 820 may further store applications 824, and the electronic device 800 can be running an operating system (OS) 826. Examples of OS 826 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

Additionally, the storage device may store logic corresponding to the analyzer 300, the component reducer 600, the file-to-component map 620, a general runtime environment 350, and/or a customized runtime environment 650.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 9:
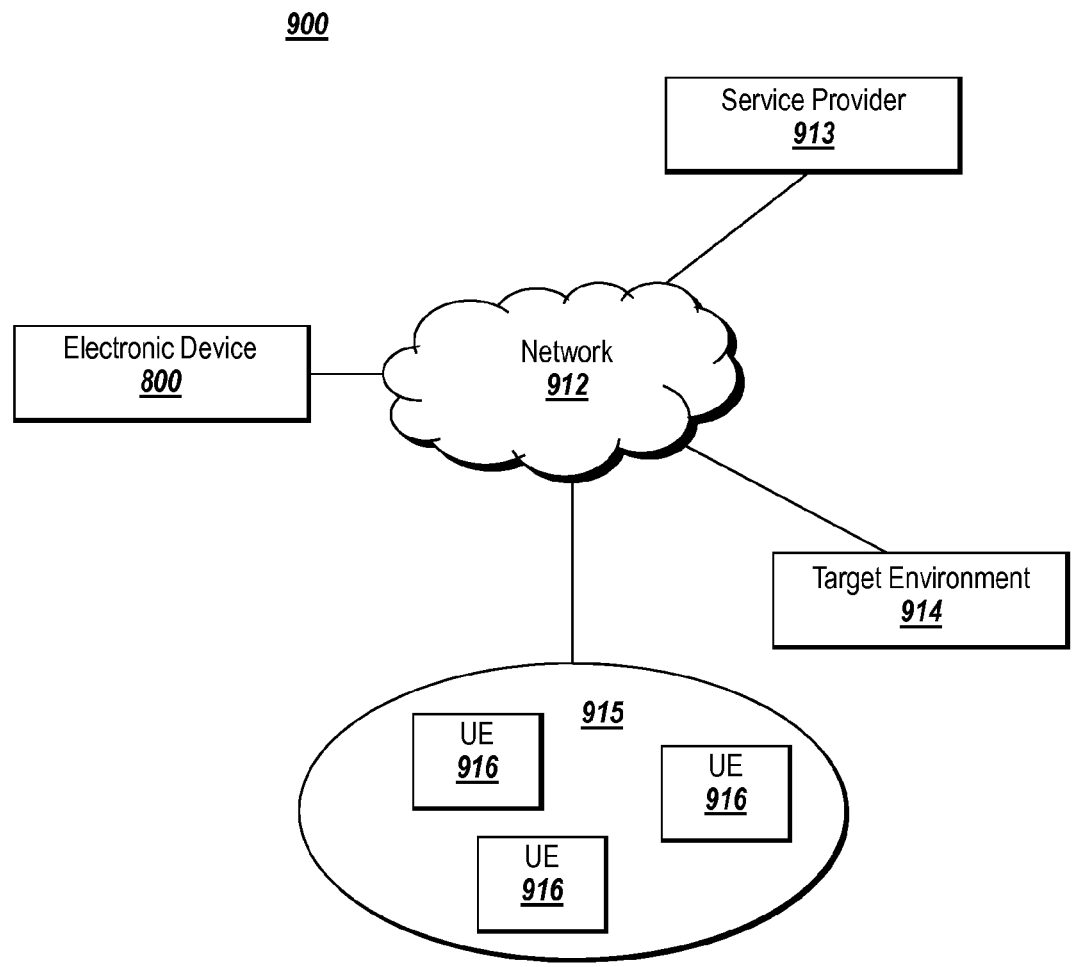
FIG. 9 depicts an exemplary network implementation suitable for use with exemplary embodiments described herein.

In some embodiments, the electronic device 800 may be part of a network implementation. FIG. 9 depicts an exemplary network implementation that may implement one or more embodiments of the invention. A system 900 may include an electronic device 800, a network 912, a service provider 913, a target environment 914, and a cluster 915. The embodiment of FIG. 9 is exemplary, and other embodiments can include more devices, fewer devices, or devices in arrangements that differ from the arrangement of FIG. 9.

The network 912 may transport data from a source to a destination. Embodiments of the network 912 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the electronic device 800, the service provider 913, etc.). Data may include digital information or analog information. Data may further be packetized and/or non-packetized.

The network 912 may be a hardwired network using wired conductors and/or optical fibers and/or may be a wireless network using free-space optical, radio frequency (RF), and/or acoustic transmission paths. In one implementation, the network 912 may be a substantially open public network, such as the Internet. In another implementation, the network 912 may be a more restricted network, such as a corporate virtual network. The network 912 may include Internet, intranet, Local Area Network (LAN), Wide Area Network (WAN), Metropolitan Area Network (MAN), wireless network (e.g., using IEEE 802.11), or other type of network The network 912 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 913 may include a device that makes a service available to another device. For example, the service provider 913 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 914 may include a device that receives information over the network 912. For example, the target environment 914 may be a device that receives user input from the electronic device 800.

The cluster 915 may include a number of units of execution (UEs) 916 and may perform processing on behalf of the electronic device 800 and/or another device, such as the service provider 913. For example, the cluster 915 may perform parallel processing on an operation received from the electronic device 800. The cluster 915 may include UEs 916 that reside on a single device or chip or that reside on a number of devices or chips.

The units of execution (UEs) 916 may include processing devices that perform operations on behalf of a device, such as a requesting device. A UE may be a microprocessor, field programmable gate array (FPGA), and/or another type of processing device. UE 916 may include code, such as code for an operating environment. For example, a UE may run a portion of an operating environment that pertains to parallel processing activities. The service provider 913 may operate the cluster 915 and may provide interactive optimization capabilities to the electronic device 800 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of a electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory computer-readable medium storing instructions that, when executed by one or more processors, cause the one or more processors to:
   receive a program written in a late-bound programming language that supports function overloading, where:
      the program has a structure; and
      the late bound programming language delays function binding until a run time of the program;
   identify a function call of a function in the program, the function having a function name and the function being overloaded such that the multiple function implementations are provided for the function name, the function call being bound during the run time of the program, the function call being bound by a function binding, the function binding specifying:
  which of the function implementations is to be invoked in response to the function call, and
  the function name;
analyze the function call during the run time of the program, wherein the function call specifies one or more function arguments, each of the one or more function arguments having a type, the analyzing comprising:
  collecting the type of the one or more function arguments when the function is called during the run time of the program,
  collecting an execution context representing a state of the runtime environment executing the program when the program is running, and
  collecting dependency relationships between functions and data objects in the program;
determine a set of one or more predicted function bindings for the program, the determining based on the analyzing of the collected type of the one or more function arguments, the collected execution context and/or the collected dependency relationships; and
generate a customized runtime environment for the program, the customized runtime environment including the predicted function bindings.

2. The medium of claim 1, wherein the function binding further specifies a name of a runtime environment capable of executing the function.

3. The medium of claim 1, wherein the function binding further specifies the type of one or more function arguments.

4. The medium of claim 1, further storing instructions that, when executed by one or more processors, cause the one or more processors to:
  execute the program using a test suite that, the test suite calling the function under a plurality of conditions, the plurality of conditions comprising a plurality of test function calls, the plurality of test function calls using a plurality of different types of inputs.

5. The medium of claim 1, wherein the runtime environment continuously collects function binding data for use in the analyzing.

6. The medium of claim 1, wherein the programming language is associated with a general runtime environment, and the customized runtime environment is smaller than the general runtime environment.

7. The medium of claim 1, wherein the analyzing comprises:
  identifying a list of files that support the set of predicted function bindings, and the files in the identified list are incorporated into the customized runtime environment.

8. The medium of claim 1, wherein the execution context comprises:
  one or more function call chains in which an output of an outputting function is provided as an input to the function having the function call that is bound during the run time of the program.

9. The medium of claim 1, wherein the execution context comprises:
  clusters of related functions that are called together in the program, the cluster including the function whose function call is bound during the run time of the program.

10. The medium of claim 1, further storing instructions that, when executed by one or more processors, cause the one or more processors to:
  extract the structure of the program, the extracting performed without reference to data types.

11. The medium of claim 1, wherein the analyzing comprises:
  a Markov chain analysis, or
  a Bayesian inference.

12. The medium of claim 1, wherein determining the set of predicted function bindings comprises:
  providing possible function bindings for the function call, and
  eliminating one or more of the possible function bindings based on the analysis of the function call.

13. The medium of claim 1, further storing instructions that, when executed by one or more processors, cause the one or more processors to:
  recursively analyze the set of predicted function bindings; and
  determine, based on the analyzing:
    whether the set of predicted function bindings is sufficient for execution of the program, or
    whether the set of predicted function bindings include one or more unnecessary function bindings.

14. A method comprising:
  receiving a program written in a late-bound programming language that supports function overloading, where:
    the program has a structure; and
    the late bound programming language delays function binding until a run time of the program;
  identifying a function call of a function in the program, the function having a function name and the function being overloaded such that the multiple function implementations are provided for the function name, the function call being bound during the run time of the program, the function call being bound by a function binding, the function binding specifying:
    which of the function implementations is to be invoked in response to the function call, and
    the function name;
  analyzing the function call during the run time of the program, wherein the function call specifies one or more function arguments, each of the one or more function arguments having a type, the analyzing comprising:
    collecting the type of the one or more function arguments when the function is called during the run time of the program,
    collecting an execution context representing a state of the runtime environment executing the program when the program is running, and
    collecting dependency relationships between functions and data objects in the program;
  determining a set of one or more predicted function bindings for the program, the determining based on the analyzing of the collected type of the one or more function arguments, the collected execution context and/or the collected dependency relationships; and
  generating a customized runtime environment for the program, the customized runtime environment including the predicted function bindings.

15. The method of claim 14, further comprising executing the program using a test suite that calls the function under different conditions, the different conditions comprising a plurality of test function calls using a plurality of different types of inputs.

16. The method of claim 14, wherein the programming language is associated with a general runtime environment, and the customized runtime environment is smaller than the general runtime environment.

17. The method of claim 14, wherein the analysis identifies a list of files that support the set of predicted function bindings, and the identified files are incorporated into the customized runtime environment.

18. The method of claim 14, wherein the execution context comprises:
one or more function call chains in which an output of an outputting function is provided as an input to the function whose function call is bound during the run time of the program, or
clusters of related functions that are called together in the program, the cluster including the function whose function call is bound during the run time of the program.

19. A system comprising:
a non-transitory storage medium storing a program written in a late-bound programming language that supports function overloading that delays function binding until a run time of the program; and
one or more processors configured to
receive a program written in a late-bound programming language, where:
the program has a structure; and
the late bound programming language delays function binding until a run time of the program;
identify a function call of a function in the program, the function having a function name and the function being overloaded such that multiple function implementations are provided for function name, the function call being bound during the run time of the program, the function call being bound by a function binding, the function binding specifying:
which of the function implementations is to be invoked in response to the function call, and
the function name;
analyze the function call during the run time of the program, wherein the function call specifies one or more function arguments, each of the one or more function arguments having a type, the analyzing comprising:
collecting the type of the one or more function arguments when the function is called during the run time of the program,
collecting an execution context representing a state of the runtime environment executing the program when the program is running, and
collecting dependency relationships between functions and data objects in the program;
determine a set of one or more predicted function bindings for the program, the determining based on the analyzing of the collected type of the one or more function arguments the collected execution context and/or the collected dependency relationships; and
generate a customized runtime environment for the program, the customized runtime environment including the predicted function bindings.

20. The system of claim 19, wherein the program is executed using a test suite that calls the function under different conditions, the different conditions comprising a plurality of test function calls using a plurality of different types of inputs.

21. The system of claim 19, wherein the programming language is associated with a general runtime environment, and the customized runtime environment is smaller than the general runtime environment.

22. The system of claim 19, wherein the analysis identifies a list of files that support the set of predicted function bindings, and the identified files are incorporated into the customized runtime environment.

23. The system of claim 19, wherein the execution context comprises:
one or more function call chains in which an output of an outputting function is provided as an input to the function whose function call is bound during the run time of the program, or
clusters of related functions that are called together in the program, the cluster including the function whose function call is bound during the run time of the program.

24. The system of claim 19, wherein the storage medium further stores a library of possible function bindings for the function call.

* * * * *